(12) United States Patent
Soryal et al.

(10) Patent No.: US 11,671,910 B1
(45) Date of Patent: Jun. 6, 2023

(54) COMMUNICATION NETWORK APPLICATION PROGRAMMING INTERFACE PROMULGATION

(71) Applicant: AT&T Intellectual Property I, L.P., Atlanta, GA (US)

(72) Inventors: Joseph Soryal, Glendale, NY (US); Christina Cacioppo, Freehold, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 17/655,848

(22) Filed: Mar. 22, 2022

(51) Int. Cl.
*H04W 48/20* (2009.01)
*H04L 41/28* (2022.01)
*H04L 9/40* (2022.01)

(52) U.S. Cl.
CPC ............. *H04W 48/20* (2013.01); *H04L 41/28* (2013.01); *H04L 63/029* (2013.01)

(58) Field of Classification Search
CPC ....... H04W 48/20; H04L 41/28; H04L 63/029
See application file for complete search history.

(56) References Cited

U.S. PATENT DOCUMENTS

| | | | | |
|---|---|---|---|---|
| 11,228,573 B1* | 1/2022 | Rangasamy | ...... | H04L 12/40006 |
| 2015/0312832 A1* | 10/2015 | Huang | .................. | H04W 88/16 370/338 |

* cited by examiner

*Primary Examiner* — Bryan Lee
(74) *Attorney, Agent, or Firm* — Amin, Turocy & Watson, LLP

(57) ABSTRACT

The described technology is generally directed towards communication network application programming interface (API) promulgation. Using the techniques herein, APIs can be hosted at different locations within a network in a transitory manner, shifting from one location to the next. Furthermore, API configurations can change over time, in order to provide enhanced API security and/or to meet different expected needs of client equipment. An API manager can select network equipment to host APIs, in order to move the APIs between different network locations. A floater application within the core network can support the movement of the APIs by creating secure tunnels between the selected network equipment and the core network.

20 Claims, 10 Drawing Sheets

COMMUNICATION NETWORK APPLICATION PROGRAMMING INTERFACE PROMULGATION

TECHNICAL FIELD

The subject application is related to cellular communication networks, and more particularly, to Application Programming Interfaces (APIs) available via cellular communication networks.

BACKGROUND

Cellular service providers can optionally make certain data and/or functions available via Application Programming Interfaces (APIs). Client equipment, such as consumer and business equipment that connects to a cellular network, can run applications that have automated access to available data and/or functions via cellular network APIs.

Example client equipment that can beneficially use cellular network APIs includes laptop and desktop computers, mobile telephones, gaming equipment, augment reality (AR) equipment, virtual reality (VR) equipment, manufacturing equipment, healthcare equipment, automobiles and other vehicles, internet of things (IoT) equipment, and health and fitness equipment. Example cellular network APIs can provide authentication functions, location data, movement data, and network data and statistics such as various types of network delay information.

One approach to providing cellular network APIs is to use a fixed API gateway to host the cellular network APIs. The fixed API gateway bridges between client equipment and the core cellular network equipment. Client equipment can be provided with an address of the fixed API gateway, and the client equipment can use the address to access cellular network APIs via the fixed API gateway at any time.

While the use of a fixed API gateway is technically straightforward, it also presents a security vulnerability. Over time and with persistent probing, even with traffic encryption, hackers can acquire valuable insights that may enable them to access the core cellular network equipment, e.g., by spoofing authorized entities.

The above-described background is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
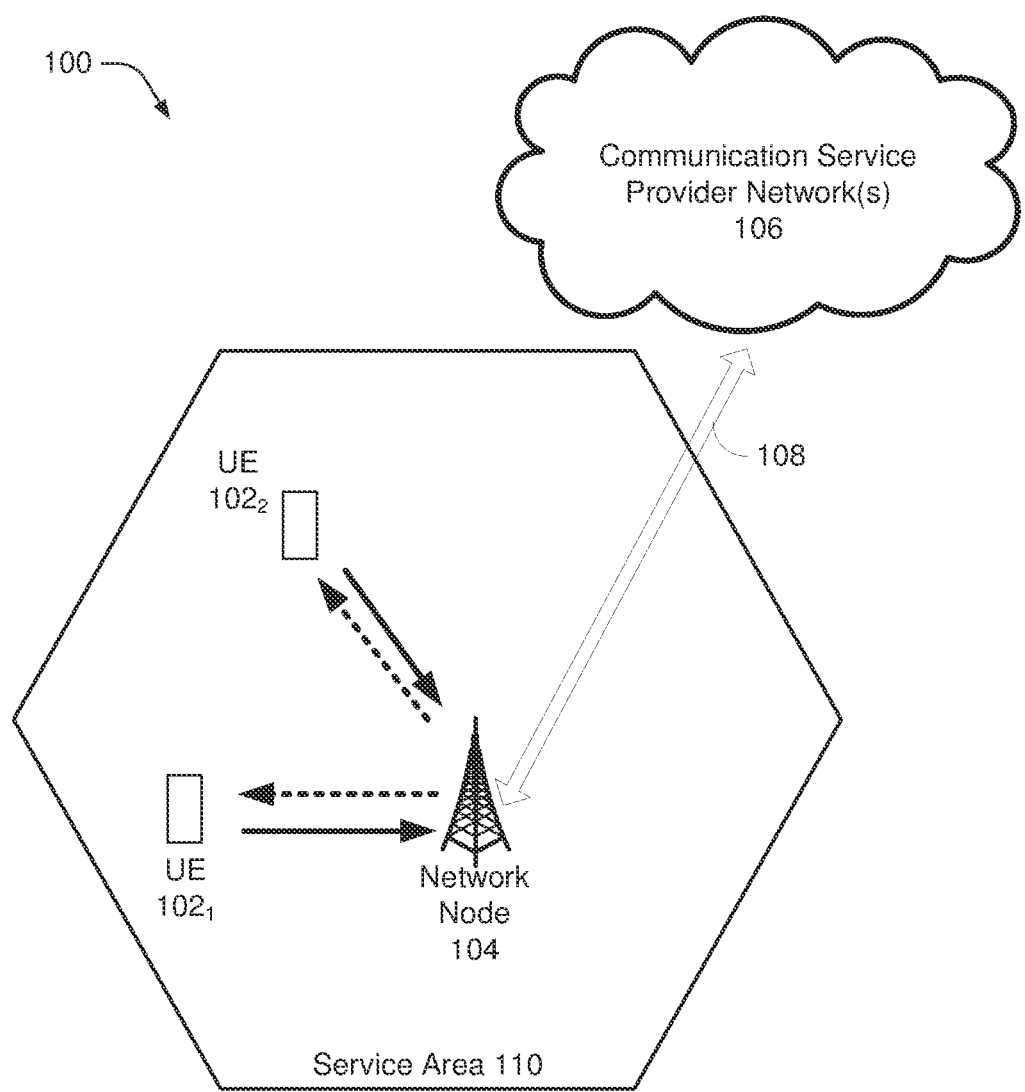
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards communication network application programming interface (API) promulgation. Using the techniques herein, APIs can be hosted at different locations within a network in a transitory manner, shifting from one location to the next. Furthermore, API configurations can change over time, in order to provide enhanced API security and/or to meet different expected needs of client equipment. An API manager can select network equipment to host APIs, in order to move the APIs between different network locations. A floater application within the core network can support the movement of the APIs by creating secure tunnels between the selected network equipment and the core network. Further aspects and embodiments of this disclosure are described in detail below.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments have been described herein in the context of 4G, 5G, or other next generation networks, the disclosed aspects are not limited to a 4G or 5G implementation, and/or other network next generation implementations, as the techniques can also be applied, for example, in third generation (3G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), LTE frequency division duplex (FDD), time division duplex (TDD), 5G, third generation partnership project 2 (3GPP2), ultra mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology. In this regard, all or substantially all aspects disclosed herein can be exploited in legacy telecommunication technologies.

FIG. 1 illustrates a non-limiting example of a wireless communication system 100 which can be used in connection with at least some embodiments of the subject disclosure. In one or more embodiments, system 100 can comprise one or more user equipment UEs $102_1$, $102_2$, referred to collectively as UEs 102, a network node 104 that supports cellular communications in a service area 110, also known as a cell, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 102 can also comprise IOT devices that communicate wirelessly.

In various embodiments, system 100 comprises communication service provider network(s) 106 serviced by one or more wireless communication network providers. Communication service provider network(s) 106 can comprise a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop multiple input multiple output (MIMO) mode and/or a rank-1 precoder mode.

A network node 104 can have a cabinet and other protected enclosures, computing devices, an antenna mast, and multiple antennas for performing various transmission operations (e.g., MIMO operations) and for directing/steering signal beams. Network node 104 can comprise one or more base station devices which implement features of the network node 104. Network nodes can serve several cells, depending on the configuration and type of antenna. In example embodiments, UEs 102 can send and/or receive communication data via a wireless link to the network node 104. The dashed arrow lines from the network node 104 to the UEs 102 represent downlink (DL) communications to the UEs 102. The solid arrow lines from the UEs 102 to the network node 104 represent uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 100 can be or comprise a large-scale wireless communication network that spans various geographic areas. According to this implementation, the one or more communication service provider networks 106 can be or comprise the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can comprise terrestrial air-interfaces or deep space links (e.g., satellite communication links for navigation). Backhaul links 108 can be implemented via a "transport network" in some embodiments. In another embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 100 can operate in accordance with any 5G, next generation communication technology, or existing communication technologies, various examples of which are listed supra. In this regard, various features and functionalities of system 100 are applicable where the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 2:
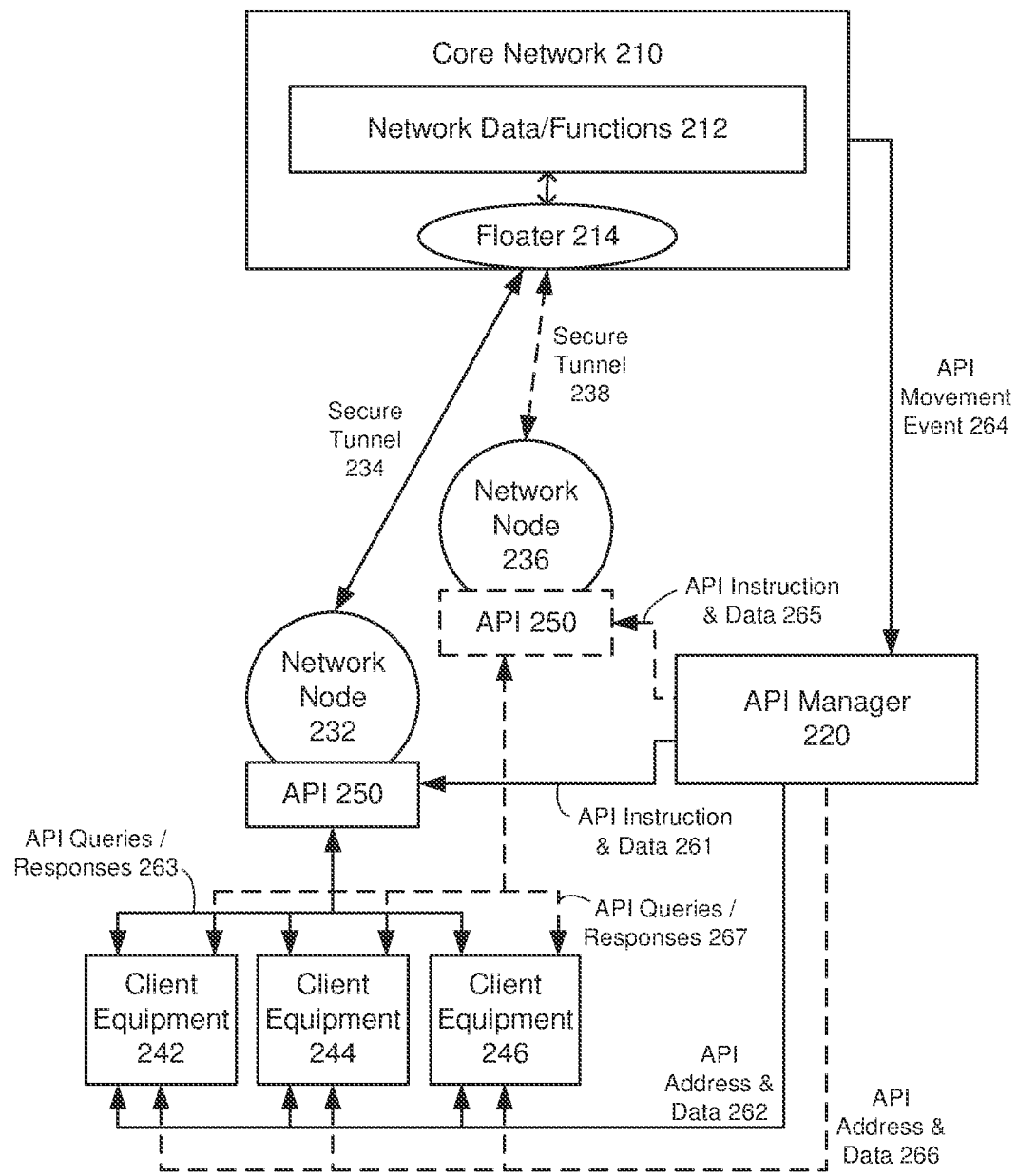
FIG. 2 illustrates an example architecture comprising a core network, an API manager, network nodes, and client equipment, in accordance with various aspects and embodiments of the subject disclosure.

FIG. 2 illustrates an example architecture comprising a core network, an API manager, network nodes, and client equipment, in accordance with various aspects and embodiments of the subject disclosure. FIG. 2 includes a core network 210, an API manager 220, network nodes 232 and 236, and client equipment 242, 244, and 246. The core network 210 includes network data/functions 212 and floater 214. An API 250 can be implemented at network node 232 and/or at network node 236, in response to instructions from the API manager 220.

In an example according to FIG. 2, the API manager 220 can initially send API instruction and data 261 to network node 232. The API instruction and data 261 can include an API instruction, that instructs the network node 232 to establish the API 250, as well as data for use in connection with the API 250, described herein. The API instruction and data 261 can enable network node 232 to establish the API 250 at the network node 232.

In response to receiving the API instruction and data 261, the network node 232 can engage in a secure tunnel protocol to establish secure tunnel 234 between network node 232 and the core network 210. In the illustrated embodiment, the network node 232 can communicate with the floater 214 at the core network 210, and the network node 232 and floater 214 can manage secure tunnel protocol communications in order to establish the secure tunnel 234. After the secure tunnel 234 is established, the network node 232 and floater 214 can use the secure tunnel 234 to exchange API 250 communications between the network node 232 and the core network 210.

The API manager 220 can send API address and data 262 to the client equipment 242, 244, 246. The API address and data 262 can include an API address that directs API communications, such as API queries/responses 263, from the client equipment 242, 244, 246 to the API 250 at the network node 232. The API address and data 262 can furthermore include data for use in connection with the API 250, described herein.

After the API manager 220 has configured the network node 232 to host the API 250, by sending API instruction and data 261 to network node 232, and the API manager 220 has configured the client equipment 242, 244, 246 to use the API 250, by sending API address and data 262 to the client equipment 242, 244, 246, the client equipment 242, 244, 246, network node 232, and core network 210 can engage in API communications, e.g., API queries/responses 263, as appropriate to serve the needs of the client equipment 242, 244, 246.

For example, applications at the client equipment 242, 244, 246 can generate API queries and can send the API queries to the API 250 hosted at the network node 232. The network node 232 can receive the API queries via the API 250 at the network node 232, and the network node 232 can forward the API queries via the secure tunnel 234. The floater 214 can receive the API queries from the network node 232, and the floater 214 can access network data/functions 212 to retrieve data requested by the API queries or to activate/control network functions according to the API queries, resulting in API responses. The floater 214 can send the API responses via secure tunnel 234 to the network node 232. The network node 232 can forward, via the API 250 at the network node 232, the API responses to the client equipment 242, 244, 246.

In response to an API movement event 264, the API manager 220 can be configured to engage in operations which move the API 250 from a current network node 232 to a different/subsequent network node 236. In FIG. 2, the API movement event 264 is illustrated as a notification from the core network 210 to the API manager 220, however, API movement event 264 is one example of an API movement event, and embodiments of this disclosure can be adapted to use other API movement events to trigger movement of the API 250.

Some example API movement events can be generated at the core network 210 and communicated to the API manager 220. Other example API movement events can be generated at the network node 232 and communicated to the API manager 220. Still further example API movement events can be generated at the API manager 220. For example, an API movement event can comprise a movement of the client equipment 242, 244, 246 from a first geographic area (e.g., a geographic area served by network node 232) to a second geographic area (e.g., a geographic area served by network node 236). The network node 232 or the core network 210 can detect the movement of the client equipment 242, 244, 246, and the network node 232 or the core network 210 can responsively generate and send an API movement event 264 to the API manager 220.

In another example, an API movement event can comprise reaching a threshold duration for the network node 232 to serve as the host of the API 250, e.g., 5 minutes, 30 minutes, 1 hour, or another duration. The API manager 220 can determine that the threshold duration has elapsed, and the API manager 220 can responsively generate an API movement event. In another example, an API movement event can comprise reaching a threshold number of API queries associated with the network node 232 serving as the host of the API 250, e.g., 500 API queries, 1000 API queries, 10,000 API queries, or another number of API queries. Or, an API movement event can comprise a decrease of a query rate of queries received at the API 250, e.g. from 100 queries per minute to 50 queries per minute, or any other decrease in query rate. The network node 232 or the core network 210 can detect the threshold number of API queries or the decrease of the query rate, and the network node 232 or the core network 210 can responsively generate and send an API movement event 264 to the API manager 220.

In order to move the API 250 from the current network node 232 to a different/subsequent network node 236, the API manager 220 can repeat the operations performed to establish the API 250 at the network node 232. For example, the API manager 220 can send API instruction and data 265 to network node 236. Similar to API instruction and data 261, the API instruction and data 265 can include an API instruction that instructs the network node 236 to establish the API 250, as well as data for use in connection with the API 250, described herein. The API instruction and data 265 can enable network node 236 to establish the API 250 at the network node 236.

In response to receiving the API instruction and data 265, the network node 236 can engage in a secure tunnel protocol to establish secure tunnel 238 between network node 236 and the core network 210. The network node 236 can communicate with the floater 214 at the core network 210, and the network node 236 and floater 214 can manage secure tunnel protocol communications in order to establish the secure tunnel 238. After the secure tunnel 238 is established, the network node 236 and floater 214 can use the secure tunnel 238 to exchange API 250 communications between the network node 236 and the core network 210.

The API manager 220 can send API address and data 266 to the client equipment 242, 244, 246. The API address and data 266 can include an API address that directs API communications, such as API queries/responses 267, from the client equipment 242, 244, 246 to the API 250 at the network node 236. The API address and data 266 can furthermore include data for use in connection with the API 250, described herein.

After the API manager 220 has configured the network node 236 to host the API 250, by sending API instruction and data 265 to network node 236, and the API manager 220 has configured the client equipment 242, 244, 246 to use the API 250, by sending API address and data 266 to the client equipment 242, 244, 246, the client equipment 242, 244, 246, network node 236, and core network 210 can engage in any API communications, e.g., API queries/responses 267, as appropriate to serve the needs of the client equipment 242, 244, 246, as described above in connection with API queries/responses 263.

An architecture such as illustrated in FIG. 2 allows network operators, such as AT&T and others, to expose their core network 210 for third party API queries by client equipment 242, 244, 246. The core network 210 can be implemented in communication service provider network(s) 106 illustrated in FIG. 1, the network nodes 232, 236 can implement a network node 104 illustrated in FIG. 1, and the client equipment 242, 244, 246 can implement user equipment 102 illustrated in FIG. 1. Example client equipment 242, 244, 246 can include, e.g., gaming and VR/AR equipment, manufacturing equipment, healthcare equipment, automotive equipment, and health & fitness equipment.

Examples of APIs which can be exposed as API 250 illustrated in FIG. 2 include authentication functions, APIs for locations and movements, and APIs for delay and other network information. API access can be provided to consumers (e.g., gamers) as well as businesses (e.g., manufacturing and AR/VR). API access requirements are unique due to the transitory nature of API queries, which make architectures such as illustrated in FIG. 2 viable.

In an architecture according to FIG. 2, API gateways implemented via network nodes 232 and 236 that host the API 250 can be transitory, short lived, virtual functions that can pop up anywhere in a network and can be established in proximity to client equipment 242, 244, 246. In some embodiments, network nodes 232 and 236 can be implemented using edge nodes, content distribution networks (CDNs), or other network node types. The API manager 220 can coordinate the deployment and redeployment of the API gateways implemented via network nodes 232 and 236. Each gateway can serve a relatively small number of client equipment 242, 244, 246, e.g. 100 devices or fewer, for short time durations, e.g., one day or less. Using such an approach, attacks can be isolated and even if one gateway is compromised, it will affect a limited number of devices for a limited amount time.

In some embodiments, a third party operator of client equipment 242, 244, 246 can create an account with the API manager 220. Account settings can specify which APIs are allowed/disallowed for client equipment 242, 244, 246, and query directions. The API manager 220 can be configured to orchestrate virtual functions for inclusion in APIs, e.g., in API 250, and the API manager 220 can track the location and connectivity of the third party client equipment 242, 244, 246.

The API manager 220 can optionally maintain an "empty" API instance, with no profile. When third party client equipment 242, 244, 246 submits a query, the API manager 220 can import the third party profile into the empty API instance.

After a threshold number of queries, or when the query rate goes down, or in response to some other API movement event, the API manager 220 can discard the virtual function implemented via API 250 at network node 232, and the API manager 220 can build a new virtual function via API 250 at network node 236. Before the old function, e.g., the API 250 at network node 232, is discarded, the API manager 220 can provide the new function address to the third party client equipment 242, 244, 246. The virtual function can form a virtual private network (VPN) secure tunnel, e.g., secure tunnel 234 or 238, to the core network 210.

In some embodiments, the third party client equipment 242, 244, 246 can access the virtual function implemented via API 250 by providing a distributed ledger token that has previous API transactions hashed and chained. The API manager 250 can provide a copy of the token to the virtual function, e.g. as part of API instruction and data 265. As an extra layer of security, the third party client equipment 242, 244, 246 and the virtual function implemented via API 250 can exchange previous query response values or other history data as a security measure to validate one another's identities.

As a further security measure, the API manager 220 can implement a changing "API catalog" which can include changing numberings or other changing codes for allowed API queries. The changing numberings can change, e.g., with every virtual function and every time an API 250 is moved from one network node 232 to another network node 236. The API manager 220 can be configured to send updated API catalogues to client equipment 242, 244, 246 as well as to a network node 236 each time an API 250 is moved, and the client equipment 242, 244, 246 and network node 236 can be configured to use the updated API catalog in connection with API queries and responses.

For example, instead of client equipment 242, 244, 246 sending an explicit query for the location of a user, the client equipment 242, 244, 246 can use an API catalog to retrieve a code, and the client equipment 242, 244, 246 can then send a short code such as "GET 2334" to the network node 236. The network node 236 can use the API catalog to translate the code to formulate the correct location query. In response to an old virtual function (e.g., API 250 at network node 232) being discarded, the API manager 220 can provide the client equipment 242, 244, 246 as well as the new network node 236 with a new API catalog including new codes. The API catalog feature further confuses any bad actors attempting to monitor API queries and responses.

Figure 3:
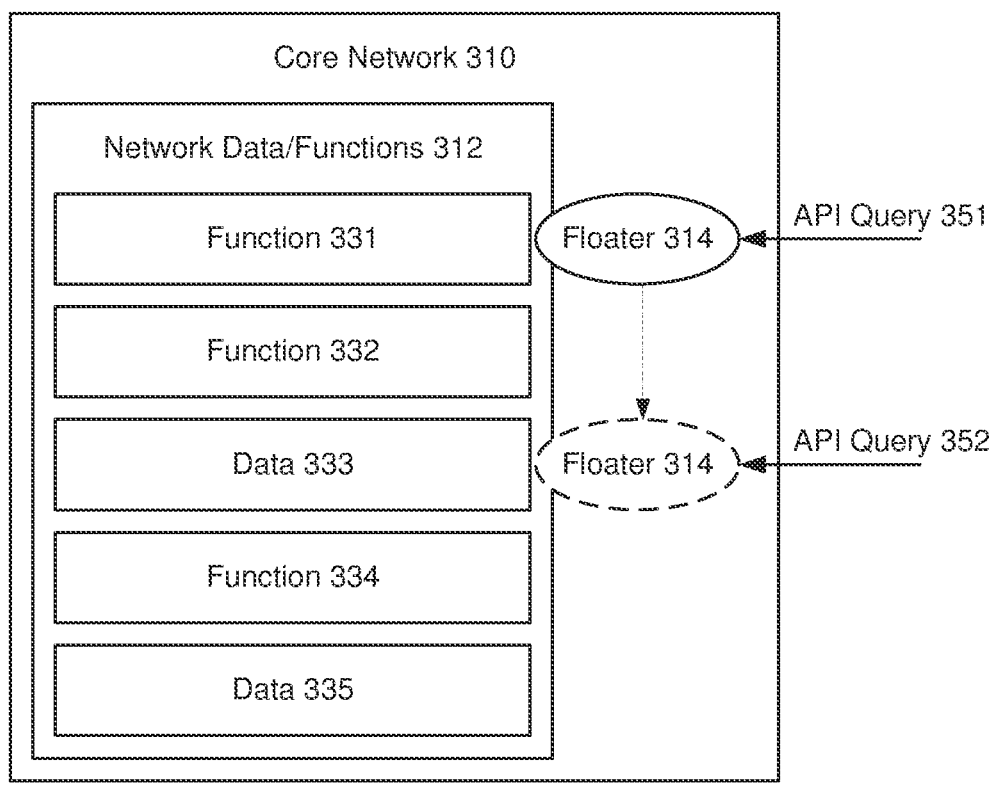
FIG. 3 illustrates an example core network comprising network data and functions, as well as a floater application, in accordance with various aspects and embodiments of the subject disclosure.

FIG. 3 illustrates an example core network comprising network data and functions, as well as a floater application, in accordance with various aspects and embodiments of the subject disclosure. FIG. 3 includes an example core network 310, which can implement the core network 210 introduced in FIG. 2. The core network 310 includes network data/functions 312 and floater 314. The network data/functions 312 can implement the network data/functions 212, and the floater 314 can implement the floater 214. The network data/functions 312 includes example function 331, example function 332, example data 333, example function 334, and example data 335.

A floater application such as floater 314 can generally be configured to perform at least two sets of tasks. A first set of tasks can comprise discovering core network functions and data and generating and publishing APIs to allow API access to the core network functions and data. A second set of tasks can comprise supporting API queries by establishing secure tunnels with network nodes, and processing incoming API queries received via the secure tunnels. FIG. 3 illustrates the floater 314 in two different example locations within the core network 310, to reflect the floater 314 "crawling" through the core network 310 to conduct API discovery tasks.

Meanwhile, floater 314 can simultaneously process API queries such as API query 351 and API query 352.

The core network 310 comprising the floater 314 contrasts with mechanisms that allow an API to directly interact with the core code, class objects, databases and logs. The floater 314 can function as a distributed gateway termination point to form secure tunnels with network nodes such as 232 and 236 in FIG. 2. The floater 314 can optionally be implemented over an operating system layer, and the floater 314 can have a "crawling" function to discover and expose API functions such as code, classes, databases, logs and folders within the core network 310.

In some embodiments, the floater 314 can be implemented as a software application that can "travel" within the core network 310, e.g., between multiple virtual machines, containers, folders, databases, or other parts of the core network 310. The floater 314 can furthermore interact with classes/objects of the core network 310 to process API queries and responses.

In some embodiments, the floater 314 can implement a firewall that ensures API queries are benign, authorized, and valid. The floater 314 can parse API queries, and direct API queries to their appropriate function or data, e.g. to a system, class, or function of the core network 310. The floater 314 can optionally furthermore monitor CPUs and memory consumption and can correlate irregularities such as too many API queries or exhaustive API queries with CPU and memory measurements, in order to determine whether API queries are malicious. The floater 314 can monitor for deviations that can be produced, e.g., by queries that request irregular types or amounts of data. In some embodiments, the floater 314 can cache the results of API queries for a "validity period," and the floater 314 can use cached data for other queries from other entities. A validity period parameter can be added to cached API query data.

Figure 4:
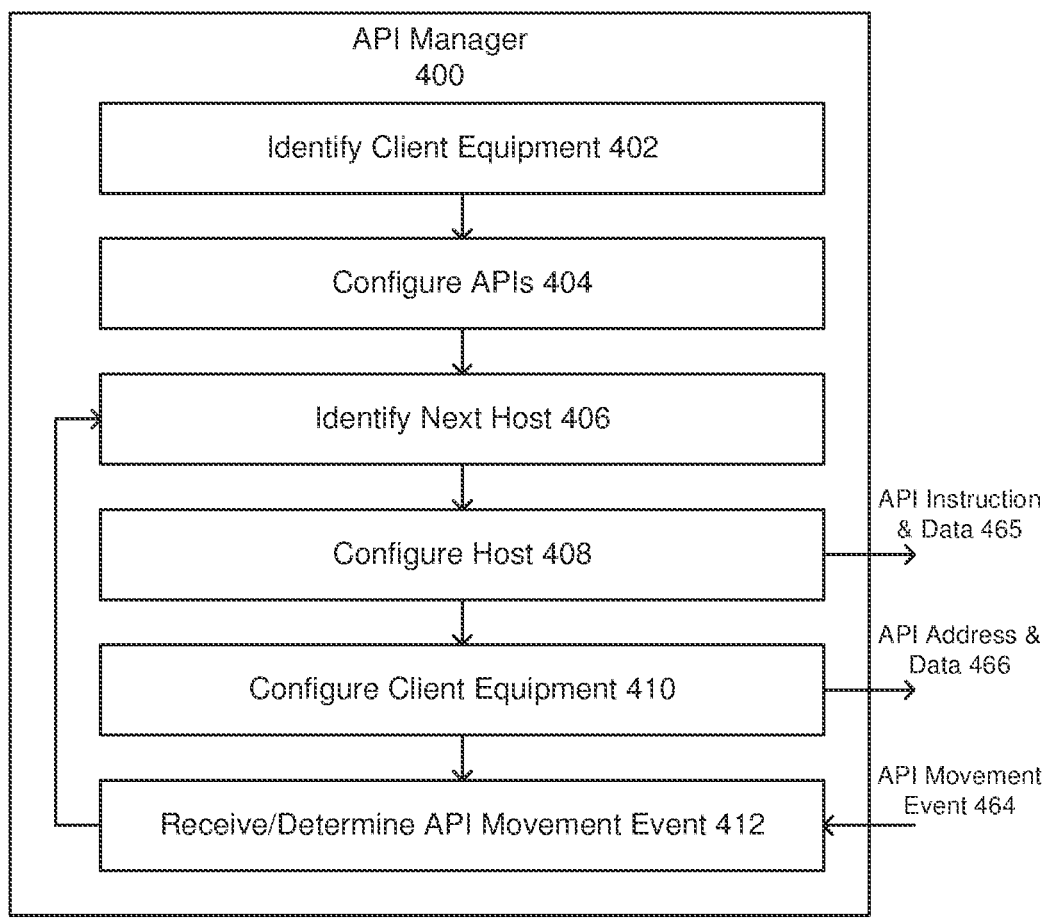
FIG. 4 illustrates an example API manager that can implement the API manager introduced in FIG. 2, in accordance with various aspects and embodiments of the subject disclosure.

FIG. 4 illustrates an example API manager that can implement the API manager introduced in FIG. 2, in accordance with various aspects and embodiments of the subject disclosure. The example API manager 400 can implement the API manager 220 in some embodiments. The example API manager 400 includes identify client equipment 402, configure APIs 404, identify next host 406, configure host 408, configure client equipment 410, and receive/determine API movement event 412.

Example operations of the API manager 400 can comprise, e.g., using identify client equipment 402 to identify a group of one or more client equipment devices, e.g., the client equipment devices 242, 244, 246, for which to establish an API. In some embodiments, the client equipment devices can be identified based on common API requirements, e.g., when the client equipment is vehicles, the client equipment may all use a same or similar set of vehicle-based API functions. In some embodiments, the client equipment devices can be identified based on location of the client equipment devices, e.g., location of client equipment devices in a same geographical area.

Example operations of the API manager 400 can further comprise, e.g., using configure APIs 404 to determine a set of APIs for the identified client equipment. For example, different client equipment may use different APIs, and configure APIs 404 can determine an appropriate set of APIs that are likely to be used by identified client equipment 242, 244, 246, based on equipment type, location, API query history, or other information.

Having identified client equipment and configured the APIs for the client equipment, the API manager 400 can next use identify next host 406, configure host 408, configure client equipment 410, and receive/determine API movement event 412, in a repeating cycle, as shown, to establish the configured set of APIs at different network nodes for use by the client equipment. Identify next host 406 can identify a network node, e.g., network node 232, to host the set of APIs, e.g., API 250. Configure host 408 can send an API instruction and data 261 to the network node 232 in order to establish the API 250 at the network node 232. Configure client equipment 410 can send API address and data 262 to the client equipment, e.g., client equipment 242, 244, 246, in order to configure the client equipment 242, 244, 246 to use the API 250 at the network node 232. Receive/determine API movement event 412 can receive or determine an API movement event 264, and trigger, in response to the API movement event 264, a next cycle of identify next host 406, configure host 408, configure client equipment 410, and receive/determine API movement event 412. In the next cycle, the API manager 400 can identify, e.g., network node 236; the API manager 400 can send API instruction and data 265 to configure network node 236 to host the API 250; and the API manager 400 can send API address and data 266 to configure the client equipment 242, 244, 246 to use the API 250 hosted at the network node 236.

Figure 5:
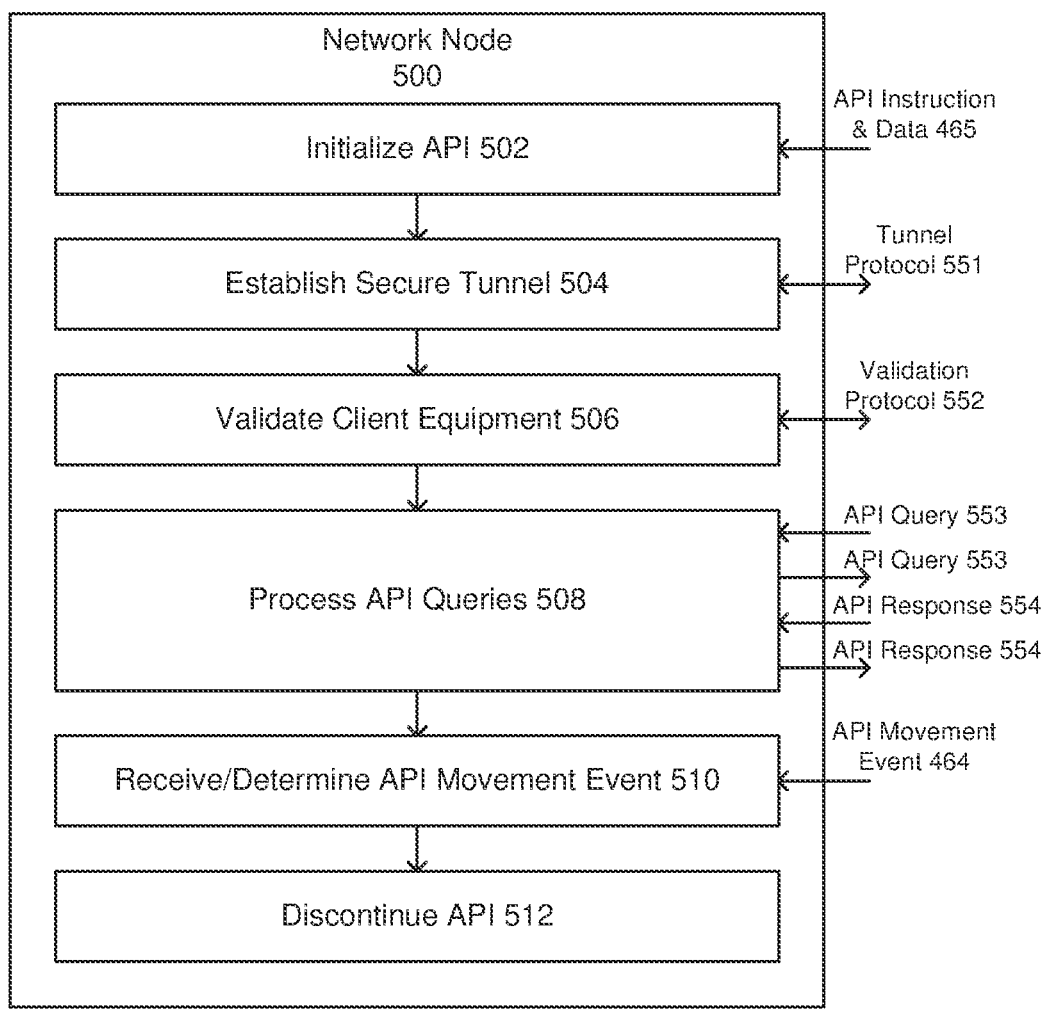
FIG. 5 illustrates an example network node that can implement the network node introduced in FIG. 2, in accordance with various aspects and embodiments of the subject disclosure.

FIG. 5 illustrates an example network node that can implement the network node introduced in FIG. 2, in accordance with various aspects and embodiments of the subject disclosure. The example network node 500 can implement, e.g., a network node such as 232 or 236 in some embodiments. The example network node 500 includes initialize API 502, establish secure tunnel 504, validate client equipment 506, process API queries 508, receive/determine API movement event 510, and discontinue API 512.

Example operations of the network node 500 can comprise, e.g., using initialize API 502 to initialize, in response to an API instruction and data 465, an API or set of APIs according to the API instruction and data 465. The network node 500 can start a component or process configured to receive and process API queries from client equipment. Establish secure tunnel 504 can initiate a tunnel protocol 551 comprising, e.g., a series of communications with a floater 214, which establish a secure communications pathway or tunnel for API communications between the network node 500 and the floater 214. Validate client equipment 506 can use a validation protocol 552 to validate client equipment 242, 244, 246 that is authorized to use the API. The validation protocol 552 can comprise a series of communications with each client equipment device.

After the API is initialized, the secure tunnel is established, and the client equipment is validated, process API queries 508 can process any API queries received from the client equipment 242, 244, 246. For example, process API queries 508 can receive an API query 553 from client equipment, e.g., from client equipment 242. Process API queries 508 can forward the API query 553 to the core network via the secure tunnel. Process API queries 508 can receive an API response 554 from the core network via the secure tunnel. Process API queries 508 can forward the API response 554 to the client device 242. Similarly, process API queries 508 can simultaneously process API queries from other client equipment 244, 246.

Receive/determine API movement event 510 can receive or determine occurrence of an API movement event 264 such as described in connection with FIG. 2. When the API movement event is determined by receive/determine API movement event 510, API movement event information can optionally be sent to the core network and/or the API manager 220. Alternatively, the API movement event can comprise a notification from the API manager 220, which notifies or otherwise instructs the network node 500 to discontinue the API 250.

Discontinue API 512 can terminate the API 250 at the network node 500. For example, discontinue API 512 can stop the component or process that was initiated by initiate API 502. Discontinue API 512 can furthermore discontinue the secure tunnel established by establish secure tunnel 504, e.g., by sending a termination instruction to the floater 214.

Figure 6:
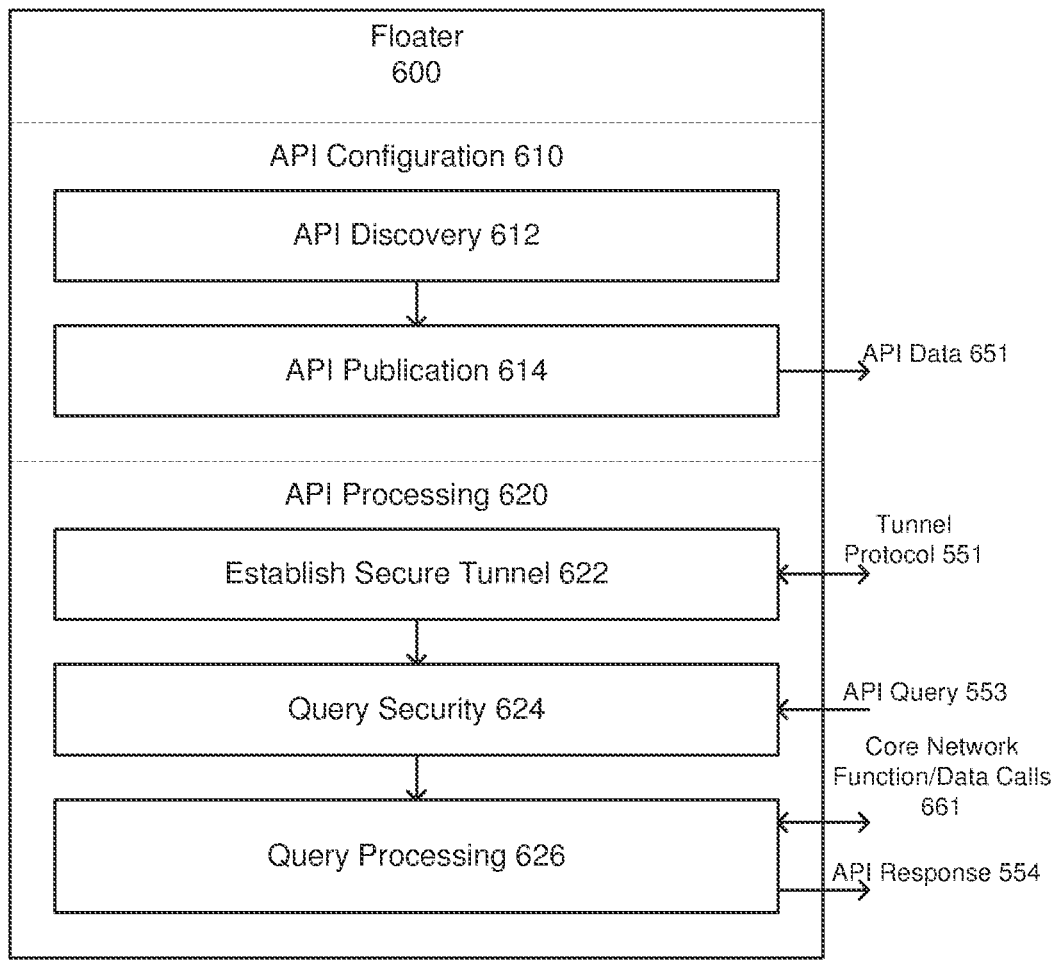
FIG. 6 illustrates an example floater that can implement the floater introduced in FIG. 2, in accordance with various aspects and embodiments of the subject disclosure.

FIG. 6 illustrates an example floater that can implement the floater introduced in FIG. 2, in accordance with various aspects and embodiments of the subject disclosure. The example floater 600 can implement the floater 214 and/or the floater 314 in some embodiments. The example floater 600 comprises a first category of functions for API configuration 610, and a second category of functions for API processing 620. API configuration 610 comprises API discovery 612 and API publication 614. API processing 620 comprises establish secure tunnel 622, query security 624, and query processing 626.

Example operations of the floater 600 can comprise, e.g., using the API configuration 610 functions to configure and publish APIs that can optionally be included in APIs established by the API manager 220. API discovery 612 can crawl core network data/functions 312 to discover functions and/or data that can be made accessible via APIs. API publication 614 can publish API data 651 that exposes the network data/functions 312 discovered by API discovery 612.

Example operations of the floater 600 can further comprise, e.g., using the API processing 620 functions to establish secure tunnels with network nodes 232, 236, and process API queries received via the secure tunnels. Establish secure tunnel 622 can engage in the tunnel protocol 551 with network nodes, in order to establish secure tunnels with the network nodes. Query security 624 can validate incoming queries, e.g., the incoming query 553, and optionally perform checks to validate client equipment 242 that originated the query 553 as well as allowability of the query 553 in view of core network security policies. Query processing 626 can perform core network function/data calls 661 in order to access network data/functions 312 and thereby generate query responses, e.g., query response 554. Query processing 626 can send the query response 554 via the secure tunnel to the originating network node, e.g., to network node 232.

Figure 7:
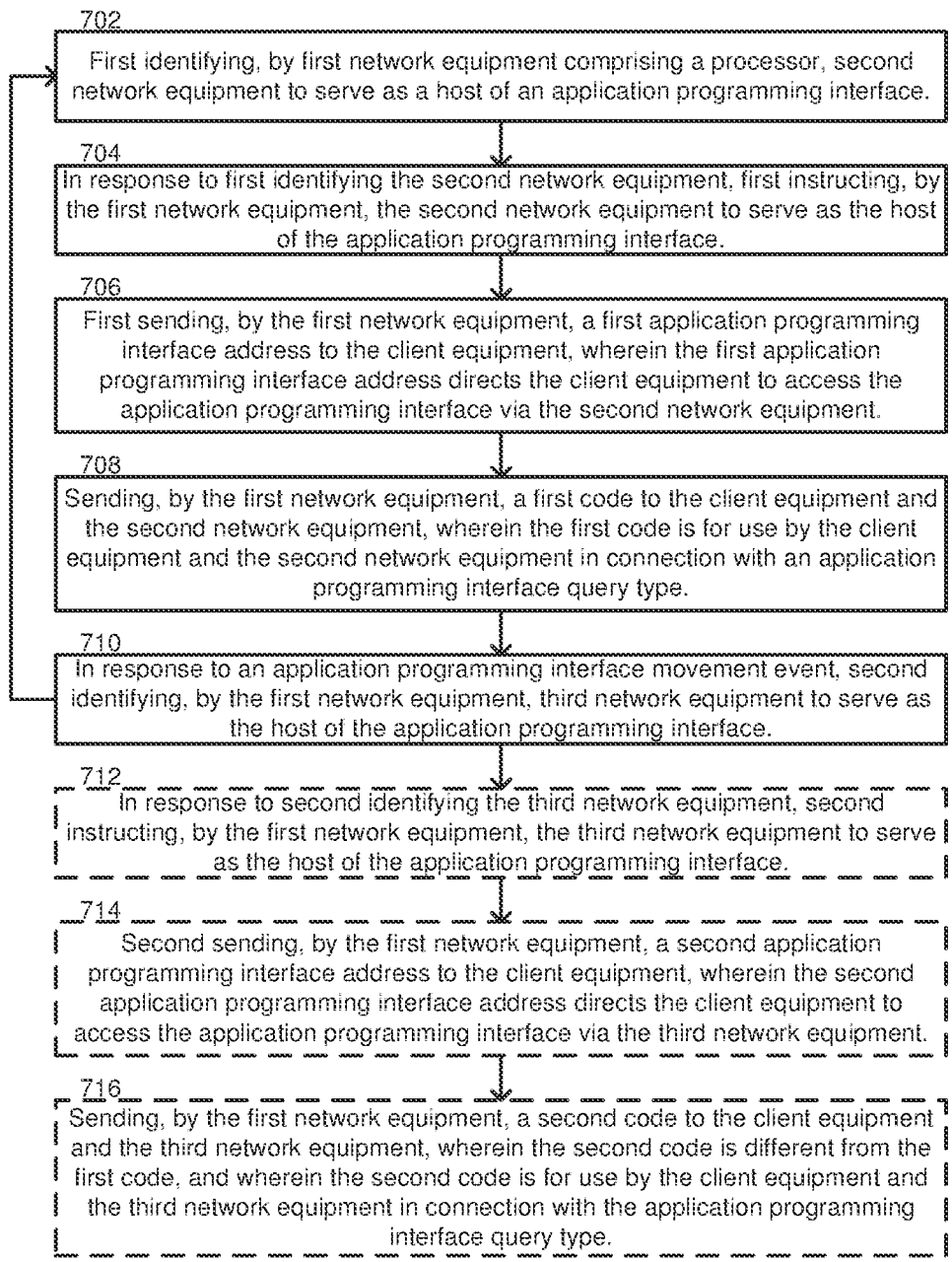
FIG. 7 is a flow diagram representing example operations of network equipment comprising an API manager, in accordance with various aspects and embodiments of the subject disclosure.

FIG. 7 is a flow diagram representing example operations of network equipment comprising an API manager, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 7 can be performed, for example, by network equipment comprising an API manager 220 such as illustrated in FIG. 2. Example operation 702 comprises first identifying, by first network equipment 220 comprising a processor, second network equipment, e.g., network node 232, to serve as a host of an API 250. The API 250 can be accessible by client equipment 242, 244, 246 in a network that comprises the first network equipment 220, the second network equipment 232, and the third network equipment, e.g., network node 236. The API 250 can comprise a configured API that is configured based on a determination of configuration properties corresponding to the client equipment 242, 244, 246. In some embodiments, first identifying the second network equipment 232 to serve as the host of the API 250 can comprise identifying the second network equipment 232 based on a first proximity of the client equipment 242, 244, 246 and the second network equipment 232.

Example operation 704 comprises, in response to first identifying the second network equipment 232, first instructing, by the first network equipment 220, the second network equipment 232 to serve as the host of the API 250. For example, the API manager 220 can send API instruction and data 261 to the network node 232.

Example operation 706 comprises first sending, by the first network equipment 220, a first API address to the client equipment 242, 244, 246, wherein the first API address directs the client equipment 242, 244, 246 to access the API 250 via the second network equipment 232. For example, the API manager 220 can send API address and data 262 to the client equipment 242, 244, 246.

Example operation 708 comprises sending, by the first network equipment 220, a first code to the client equipment 242, 244, 246 and the second network equipment 232, wherein the first code is for use by the client equipment 242, 244, 246 and the second network equipment 232 in connection with an API interface query type. For example, the API manager 220 can send to the client equipment 242, 244, 246 and to network node 232 an API catalog comprising codes for use in connection with different API queries.

Example operation 710 comprises, in response to an API movement event 264, second identifying, by the first network equipment 220, third network equipment, e.g., network node 236, to serve as the host of the API 250. In some embodiments, second identifying the third network equipment 236 to serve as the host of the API 250 can comprise identifying the third network equipment 236 based on a second proximity of the client equipment 242, 244, 246 and the third network equipment 236.

In some embodiments, the API movement event 264 can comprise, e.g., a movement of the client equipment 242, 244, 246 from a first geographic area to a second geographic area. In some embodiments, the API movement event 264 can comprise reaching a threshold duration associated with the second network equipment 232 serving as the host of the API 250 or reaching a threshold number of API queries associated with the second network equipment 232 serving as the host of the API 250. In some embodiments, the API movement event 264 can comprise a decrease of a query rate of queries received at the API 250.

An arrow in FIG. 7 indicates return from operation 710 to operation 702, to depict a repeating cycle of operations 702, 704, 706, 708, and 710. Example operations 712, 714, and 716 illustrate operations that can be performed in connection with such a repeating cycle. Example operation 712 comprises, in response to second identifying the third network equipment 236, second instructing, by the first network equipment 220, the third network equipment 236 to serve as the host of the API 250. For example, API manager 220 can send API instruction and data 265 to the network node 236. Example operation 714 comprises second sending, by the first network equipment 220, an API address to the client equipment 242, 244, 246, wherein the second API address directs the client equipment 242, 244, 246 to access the API 250 via the third network equipment 236. For example, API manager 220 can send API address and data 266 to the client equipment 242, 244, 246. Example operation 716 comprises sending, by the first network equipment 220, a second code to the client equipment 242, 244, 246 and the third network equipment 236, wherein the second code is different from the first code, and wherein the second code is for use by the client equipment 242, 244, 246 and the third network equipment 236 in connection with the API query type. For example, the API manager 220 can send updated/modified API catalog information to the network node 236 and the client equipment 242, 244, 246.

Figure 8:
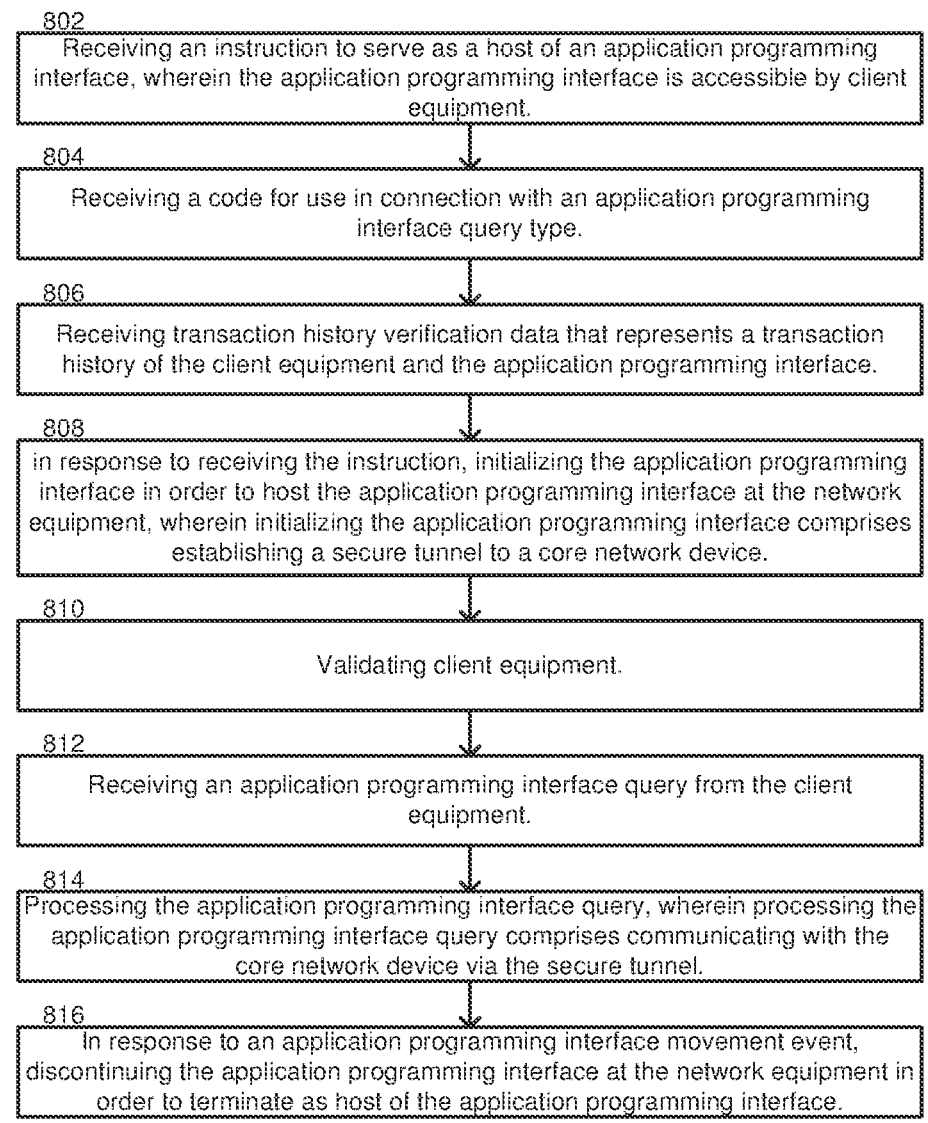
FIG. 8 is a flow diagram representing example operations of network equipment comprising a network node, in accordance with various aspects and embodiments of the subject disclosure.

FIG. 8 is a flow diagram representing example operations of network equipment comprising a network node, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 8 can be performed, for example, by network equipment comprising a network node 232 such as illustrated in FIG. 2. In some embodiments, the network node 232 can comprise an edge node of a network comprising the network node 232 and a core network 210. Example operation 802 comprises receiving an instruction 261 to serve as a host of an API 250, wherein the API 250 is accessible by client equipment 242, 244, 246.

Example operation 804 comprises receiving a code for use in connection with an API 250 query type. For example, data received as part of API instruction and data 261 can include an API catalog that includes codes for use in connection with API queries. Example operation 806 comprises receiving transaction history verification data that represents a transaction history of the client equipment 242, 244, 246 and the API 250. For example, data received as part of API instruction and data 261 can include transaction history verification data.

Example operation 808 comprises, in response to receiving the instruction 261 pursuant to operation 802, initializing the API 250 in order to host the API 250 at the network equipment 232, wherein initializing the API 250 comprises establishing a secure tunnel 234 to a core network device of the core network 210. Example operation 810 comprises validating client equipment 242, 244, 246.

Example operation 812 comprises receiving an API query, e.g., a query of API queries/responses 263, from the client equipment 242, 244, 246. Example operation 814 comprises processing the API query, wherein processing the API query comprises communicating with the core network 210 via the secure tunnel 234.

Example operation 816 comprises, in response to an API movement event 264, discontinuing the API 250 at the network equipment 232 in order to terminate as host of the API 250. In some embodiments, the API movement event 264 can comprise, e.g., a movement of the client equipment 242, 244, 246 out of a geographic area comprising the edge node 232. In some embodiments, the API movement event can comprise receiving an instruction to discontinue execution of the API 250 at the network equipment 232. In some embodiments, the API movement event 264 can comprise reaching a threshold duration associated with the network equipment 232 serving as the host of the API 250, or reaching a threshold number of API queries associated with the network equipment 232 serving as the host of the API 250, or a decrease of a query rate of queries received at the API 250.

Figure 9:
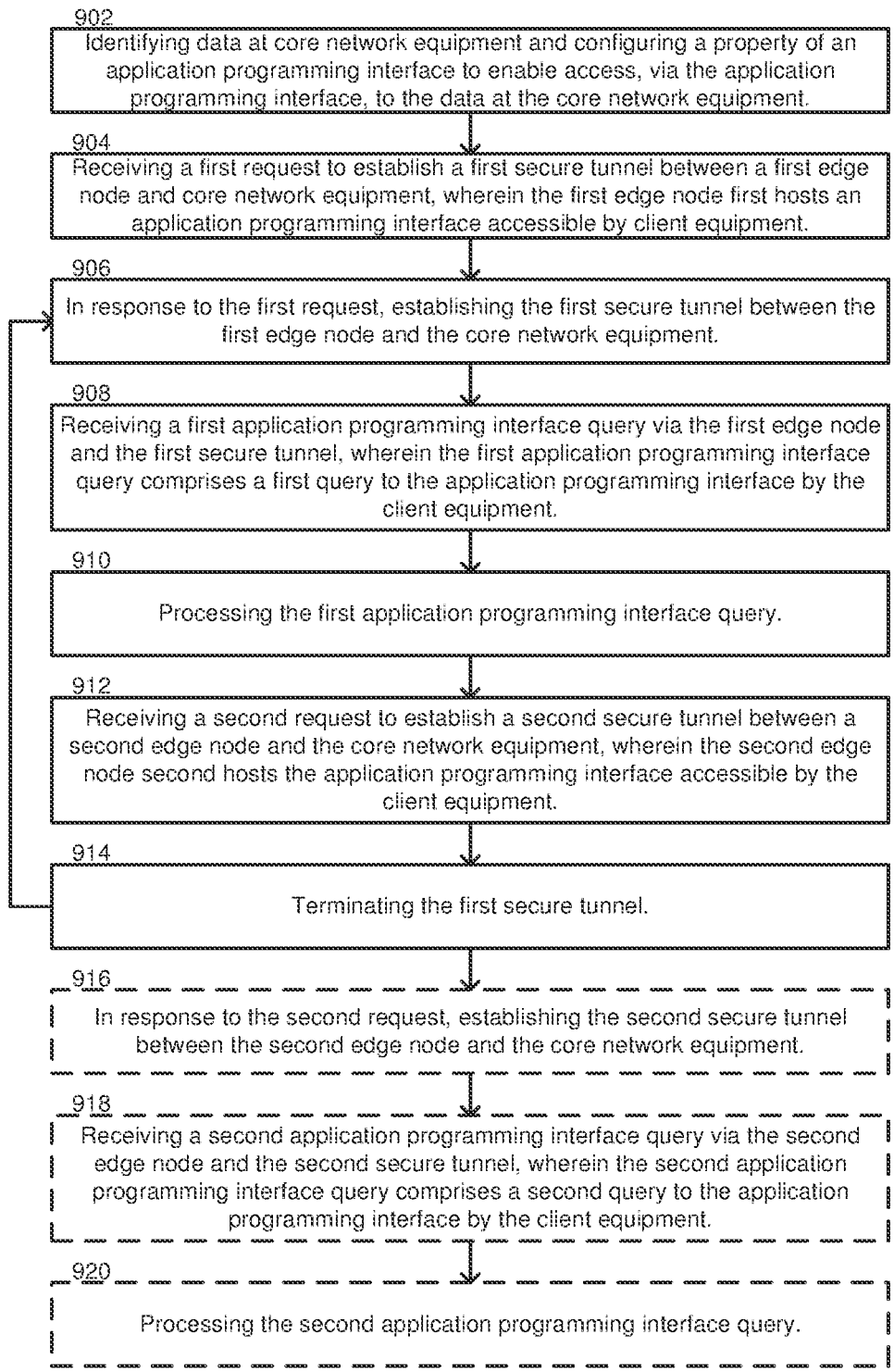
FIG. 9 is a flow diagram representing example operations of network equipment comprising a floater application, in accordance with various aspects and embodiments of the subject disclosure.

FIG. 9 is a flow diagram representing example operations of network equipment comprising a floater application, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9 can be performed, for example, by network equipment in a core network 210, e.g. network equipment that hosts a floater 214 as illustrated in FIG. 2. Example operation 902 comprises identifying data (e.g., data of network data/functions 212) at the core network equipment 210 and configuring a property of an API 250 to enable access, via the API 250, to the data 212 at the core network equipment 210. For example, API configuration functions 610 can discover and publish API data 651, as illustrated in FIG. 6.

Example operation 904 comprises receiving a first request to establish a first secure tunnel 234 between a first edge node 232 and core network equipment 210, wherein the first edge node 232 first hosts an API 250 accessible by client equipment 242, 244, 246. Example operation 906 comprises, in response to the first request, establishing the first secure tunnel 234 between the first edge node 232 and the core network equipment 210.

Example operation 908 comprises receiving a first API query (e.g., of API queries/responses 263) via the first edge node 232 and the first secure tunnel 234, wherein the first API query comprises a first query to the API 250 by the client equipment 242, 244, 246. The floater 214 can validate the first API query. Example operation 910 comprises processing the first API query. Processing the first API query can comprise identifying a core network equipment function (of network data/functions 212) to process the first API query, and subsequently employing the identified core network equipment function to process the API query.

Example operation 912 comprises receiving a second request to establish a second secure tunnel 238 between a second edge node 236 and the core network equipment 210, wherein the second edge node 236 second hosts the API 250 accessible by the client equipment 242, 244, 246. Example operation 914 comprises terminating the first secure tunnel 234.

An arrow in FIG. 9 indicates return from operation 914 to operation 906, to depict a repeating cycle of operations 906, 908, 910, 912, and 914. Example operations 916, 918, and 920 illustrate operations that can be performed in connection with such a repeating cycle. Example operation 916 comprises, in response to the second request (received at operation 912), establishing the second secure tunnel 238 between the second edge node 236 and the core network equipment 210. Example operation 918 comprises receiving a second API query (e.g., a query of API queries/responses 267) via the second edge node 236 and the second secure tunnel 238, wherein the second API query comprises a second query to the API 250 by the client equipment 242, 244, 246. Example operation 920 comprises processing the second API query.

Figure 10:
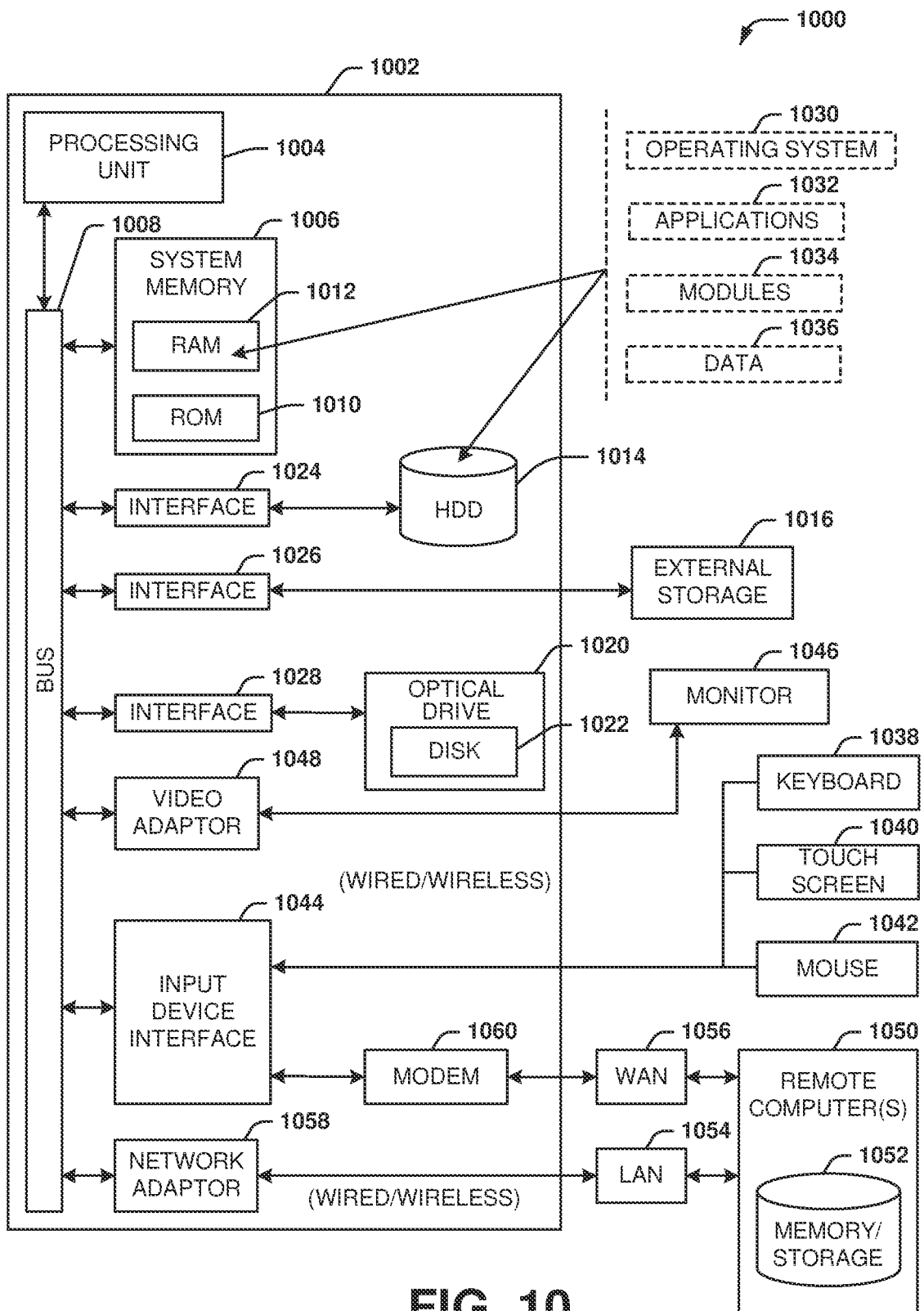
FIG. 10 is a block diagram of an example computer that can be operable to execute processes and methods in accordance with various aspects and embodiments of the subject disclosure.

FIG. 10 is a block diagram of an example computer that can be operable to execute processes and methods in accordance with various aspects and embodiments of the subject disclosure. The example computer can be adapted to implement, for example, any of the various network equipment described herein.

FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), smart card, flash memory (e.g., card, stick, key drive) or other memory technology, compact disk (CD), compact disk read only memory (CD-ROM), digital versatile disk (DVD), Blu-ray™ disc (BD) or other optical disk storage, floppy disk storage, hard disk storage, magnetic cassettes, magnetic strip(s), magnetic tape, magnetic disk storage or other magnetic storage devices, solid state drives or other solid state storage devices, a virtual device that emulates a storage device (e.g., any storage device listed herein), or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
first identifying, by first network equipment comprising a processor, second network equipment to serve as a host of an application programming interface,
wherein the application programming interface is accessible by client equipment, and
wherein a network comprises the first network equipment, the second network equipment, and the third network equipment;
in response to first identifying the second network equipment, first instructing, by the first network equipment, the second network equipment to serve as the host of the application programming interface;
first sending, by the first network equipment, a first application programming interface address to the client equipment, wherein the first application programming interface address directs the client equipment to access the application programming interface via the second network equipment;
in response to an application programming interface movement event, second identifying, by the first network equipment, the third network equipment to serve as the host of the application programming interface;
in response to second identifying the third network equipment, second instructing, by the first network equipment, the third network equipment to serve as the host of the application programming interface; and
second sending, by the first network equipment, a second application programming interface address to the client equipment, wherein the second application programming interface address directs the client equipment to access the application programming interface via the third network equipment.

2. The method of claim 1, wherein:
first identifying the second network equipment to serve as the host of the application programming interface comprises identifying the second network equipment based on a first proximity of the client equipment and the second network equipment, and
second identifying the third network equipment to serve as the host of the application programming interface comprises identifying the third network equipment based on a second proximity of the client equipment and the third network equipment.

3. The method of claim 2, wherein the application programming interface movement event comprises a movement of the client equipment from a first geographic area to a second geographic area.

4. The method of claim 1, wherein the application programming interface movement event comprises at least one of reaching a threshold duration associated with the second network equipment serving as the host of the application programming interface, or reaching a threshold number of application programming interface queries associated with the second network equipment serving as the host of the application programming interface.

5. The method of claim 1, wherein the application programming interface movement event comprises a decrease of a query rate of queries received at the application programming interface.

6. The method of claim 1, further comprising:
sending, by the first network equipment, a first code to the client equipment and the second network equipment, wherein the first code is for use by the client equipment and the second network equipment in connection with an application programming interface query type; and
sending, by the first network equipment, a second code to the client equipment and the third network equipment, wherein the second code is different from the first code, and wherein the second code is for use by the client equipment and the third network equipment in connection with the application programming interface query type.

7. The method of claim 1, wherein the application programming interface comprises a configured application programming interface that is configured based on a determination of configuration properties corresponding to the client equipment.

8. Network equipment, comprising:
a processor; and
a memory that stores executable instructions that, when executed by the processor, facilitate performance of operations, comprising:
receiving an instruction to serve as a host of an application programming interface, wherein the application programming interface is accessible by client equipment;
in response to receiving the instruction, initializing the application programming interface in order to host the application programming interface at the network equipment, wherein initializing the application programming interface comprises establishing a secure tunnel to a core network device;
receiving an application programming interface query from the client equipment;
processing the application programming interface query, wherein processing the application programming interface query comprises communicating with the core network device via the secure tunnel; and
in response to an application programming interface movement event, discontinuing the application programming interface at the network equipment in order to terminate as host of the application programming interface.

9. The network equipment of claim 8, wherein the network equipment comprises an edge node of a network comprising the network equipment and the core network device.

10. The network equipment of claim 9, wherein the application programming interface movement event comprises a movement of the client equipment out of a geographic area comprising the edge node.

11. The network equipment of claim 9, wherein the application programming interface movement event comprises receiving an instruction to discontinue execution of the application programming interface at the network equipment.

12. The network equipment of claim 9, wherein the application programming interface movement event comprises at least one of reaching a threshold duration associated with the network equipment serving as the host of the application programming interface, or reaching a threshold number of application programming interface queries associated with the network equipment serving as the host of the application programming interface.

13. The network equipment of claim 9, wherein the application programming interface movement event comprises a decrease of a query rate of queries received at the application programming interface.

14. The network equipment of claim 9, wherein the operations further comprise receiving a code for use in connection with an application programming interface query type.

15. The network equipment of claim 9, wherein the operations further comprise receiving transaction history verification data that represents a transaction history of the client equipment and the application programming interface.

16. A non-transitory machine-readable medium, comprising executable instructions that, when executed by a processor, facilitate performance of operations, comprising:

receiving a first request to establish a first secure tunnel between a first edge node and core network equipment, wherein the first edge node first hosts an application programming interface accessible by client equipment;

in response to the first request, establishing the first secure tunnel between the first edge node and the core network equipment;

receiving a first application programming interface query via the first edge node and the first secure tunnel, wherein the first application programming interface query comprises a first query to the application programming interface by the client equipment;

processing the first application programming interface query;

receiving a second request to establish a second secure tunnel between a second edge node and the core network equipment, wherein the second edge node second hosts the application programming interface accessible by the client equipment;

in response to the second request, establishing the second secure tunnel between the second edge node and the core network equipment;

receiving a second application programming interface query via the second edge node and the second secure tunnel, wherein the second application programming interface query comprises a second query to the application programming interface by the client equipment; and processing the second application programming interface query.

17. The non-transitory machine-readable medium of claim 16, wherein the operations further comprise terminating the first secure tunnel.

18. The non-transitory machine-readable medium of claim 16, wherein processing the first application programming interface query comprises identifying a core network equipment function to process the first application programming interface query.

19. The non-transitory machine-readable medium of claim 16, wherein the operations further comprise validating the first application programming interface query.

20. The non-transitory machine-readable medium of claim 16, wherein the operations further comprise identifying data at the core network equipment and configuring a property of the application programming interface to enable access, via the application programming interface, to the data at the core network equipment.

* * * * *